Aug. 16, 1966     F. MÜLLER ET AL     3,266,226
SUPERVISORY APPARATUS FOR DUST SEPARATORS OPERATING
AT OTHER THAN ATMOSPHERIC PRESSURES
Filed Oct. 18, 1963     4 Sheets-Sheet 3
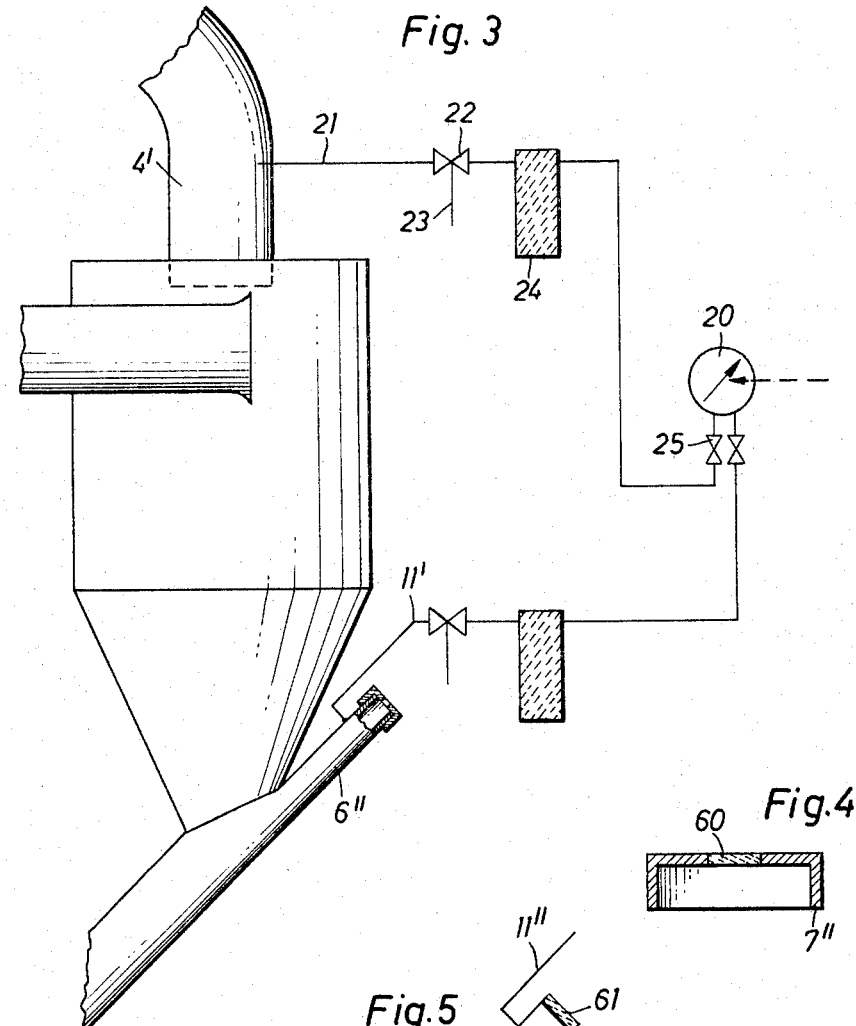

3,266,226

SUPERVISORY APPARATUS FOR DUST SEPARATORS OPERATING AT OTHER THAN ATMOSPHERIC PRESSURES

Franz Müller, Bensberg Refrath, Wilhelm Görtz, Spich, Siegkreis, and Kurt Schmillen, Cologne-Holweide, Germany, assignors to Klöckner-Humboldt-Dentz Aktiengesellschaft, Cologne-Deutz, Germany, a corporation of Germany
Filed Oct. 18, 1963, Ser. No. 317,349
Claims priority, application Germany, Oct. 18, 1962, K 48,007
6 Claims. (Cl. 55—274)

Our invention relates to apparatus for supervising or indicating the dust discharge from dust separators operating under positive or negative pressures relative to ambient atmospheric pressure, and in a more particular aspect to heat exchanging dust separators in plants for exchanging heat between gases and fine-granular solid substances.

Plants for heating cement raw material or other fine-grain solids are known in which these substances are charged into a hot-gas conduit, such as the waste-gas or flue conduit leading from a rotary kiln to a dust separator. Such a plant is described for example in U.S. Patent 2,663,560. The granular substances are entrained by the hot gases, thus passing into the separator in intimate heat-exchanging contact with the gases, before the granular material is separated from the gas. This process can be repeated once or several times in additional separators serially traversed by the gas flow, so that the granular material, travelling downwardly through the separators and hence generally in the sense of a counterflow to the gas, is gradually heated to higher temperatures before it is discharged from the lowermost separator. In such plants, as well as in dust separators generally, certain granular materials tend to form incrustations which, if permitted to remain, will ultimately clog the dust-outlet opening and the dust-discharge duct of the separators. It has been difficult to ascertain the occurrence of such agglomerations of incrustations so early that their elimination does not cause appreciable difficulties.

It is therefore an object of our invention to provide a supervisory or indicating device for dust separators capable of reliably indicating in a simple manner the occurrence of clogging or of trouble apt to result in clogging, sufficiently ahead of the possible development of the trouble which could cause damage to, or excessively long shut-down of, the plant, so that steps may be taken early enough to avert the consequent damage or shut-down.

To this end, and in accordance with a feature of our invention, the dust separator is provided with a channel or orifice through which it communicates with the ambient atmosphere in the vicinity of the dust-outlet opening and/or the dust-discharge duct, and we further provide the separator with a sensing device responsive to the gas flow through the channel or orifice, or to the changes of such equalizing gas flow which are indicative of dust-discharge irregularities.

In this manner, the occurrence of clogging or of conditions apt to result in clogging at the dust outlet of the separator can be detected with the sensing device so that the trouble can be eliminated at a time when it has not yet become excessive. Such anticipatory indication of dust-discharge irregularities is produced in the following manner.

During the operation of the plant, a negative or positive pressure relative to ambient atmospheric pressure is produced and maintained in the dust separators. Consequently, there obtains a pressure difference between the ambient atmosphere and the interior of the dust separator at the location of the aforementioned connecting channel or orifice. Normally, therefore, limited quantities of air are inducted into the separator through the orifice or limited quantities of gas normally issue from the orifice. Consequently, when relatively large accumulations of solid material form in the vicinity of the orifice location which might cause clogging, communication between the outer atmosphere and the inner space of the dust separator is reduced or interrupted. Then only a little or no gas or air will pass through the communication. Therefore, the sensing or measuring device responsive to the gas quantity passing through the communication orifice will ascertain the development of the troublesome accumulation before it can appreciably clog the dust-discharge path of the separator. No appreciable difficulties are encountered at this stage in eliminating the accumulation or incipient clogging.

According to another feature of the invention, the sensing device responsive to the gas quantity passing through the aforementioned orifice means is in the form of a pressure-measuring device for measuring the static internal pressure in the separator closely ahead of the orifice and/or the dynamic pressure at the orifice. The pressures thus responded to by the manometric device then serve as a measurement of the air or gas quantity flowing through the orifice channel.

According to still another feature of our invention, the orifice or channel through which the dust-outlet location in the interior of the separator communicates with the ambient atmosphere is closed by a gas-permeable and preferably heat-resistant filter, for example a filter of ceramic material or of sintered metal having the desired porosity. Depending upon the form of the orifice channel, the filter is made in the shape of a flat plate or a cylindrical structure for example. Such a filter prevents solid particle material from leaving the separator while permitting air or gas to pass through and is therefore preferably employed in cases in which the dust separator is under positive pressure or in which sudden pressure surges or the like may be encountered in the dust-separator system or in a device such as a rotary kiln that is connected with the system.

According to another and preferred feature of the invention, the dust separator in the vicinity of the dust-outlet opening and/or the dust-discharge duct are provided with a tubular extension which extends laterally and preferably upwardly away from the dust-outlet opening, and has the aforementioned orifice means at its outer end forming a narrow channel for communication with the ambient atmosphere, the sensing device being connected with the just-mentioned extension. Such a tubular extension, formed preferably of a tubular appendix which extends upwardly from, and substantially in alignment with, a downwardly inclined dust-discharge duct of the separator, can be so arranged and constructed as to prevent the ingress of dust into the tubular structure and thereby avoid the occurrence of sensing or measuring inaccuracies or the like.

The tubular extension is preferably provided at its outermost end with a closure cap which can be opened or removed readily and which has a narrow orifice. In the event the sensing device signals a troublesome condition, the closure cap can be removed and an iron rod can be pushed through the tubular extension for eliminating the dust accumulation or clogging. Instead of an orifice, the closure cap can be provided with the aforementioned gas-permeable filter. If desired, the outermost end of the tubular extension may also be closed entirely by a filter instead of a closure cap.

As a rule, it is further preferable to provide a filter in the tubular extension between the measuring location and the orifice or opening of the tubular extension. This prevents solid substances segregated in the dust separator from damaging the sensing device and is particularly advisable for dust separators or the like that operate under superatmospheric pressure and that may become subjected to sudden pressure increases or surges or the like.

It is further of advantage to provide dust separators constructed in accordance with the invention with a device in the dust-discharge duct and located below the dust-outlet opening of the separator chamber which permits the discharge of solid material but prevents the escape of gas. Gas or air quantities consequently are prevented from passing through the dust-discharge duct and the impairment of the sensing or measuring performance at the orifice location is thus avoided.

The above-mentioned and more specific objects, advantages and features of our invention, the features being set forth with particularity in the claims annexed hereto, will be apparent from, and will be mentioned in, the following with reference to embodiments of separators with supervisory or indicating devices according to the invention illustrated by way of example on the accompanying drawings in which:

FIG. 3 shows an embodiment equipped with a sensing device responsive to a pressure difference.

FIG. 4 is a cross section of a closure cap applicable in the embodiments shown in FIGS. 1 and 3.

FIG. 5 shows schematically and in section a modified portion of a device in which an extension of the dust-discharge duct is provided with filters.

Figure 1:
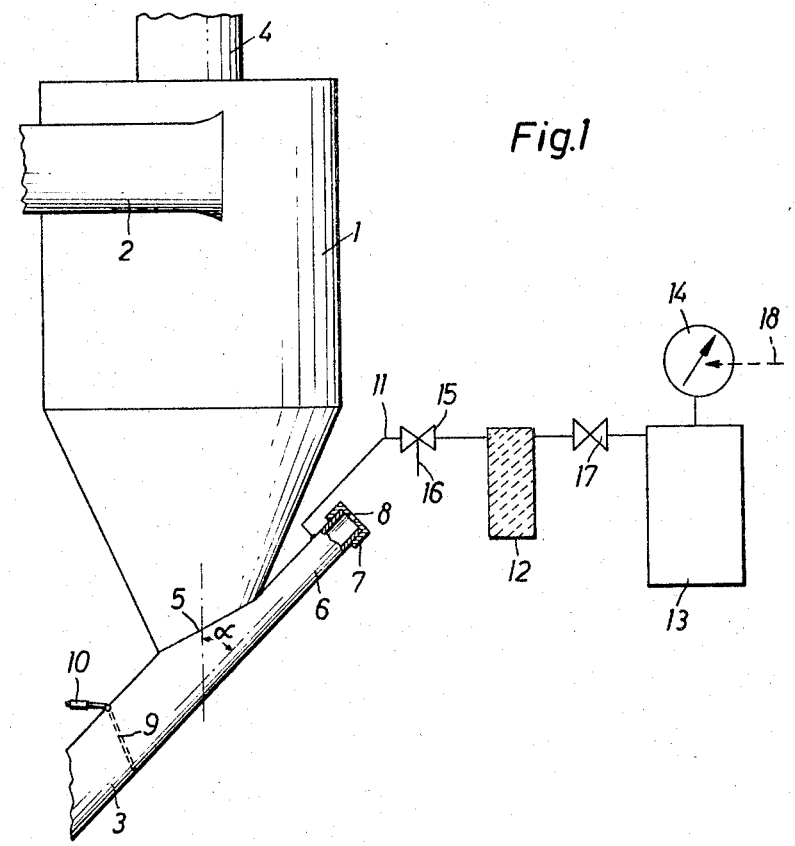
FIG. 1 shows schematically and partly in section an embodiment of the apparatus constructed in accordance with our invention provided with an orifice cap on a tubular extension or appendix of the dust-discharge duct.
Figure 6:
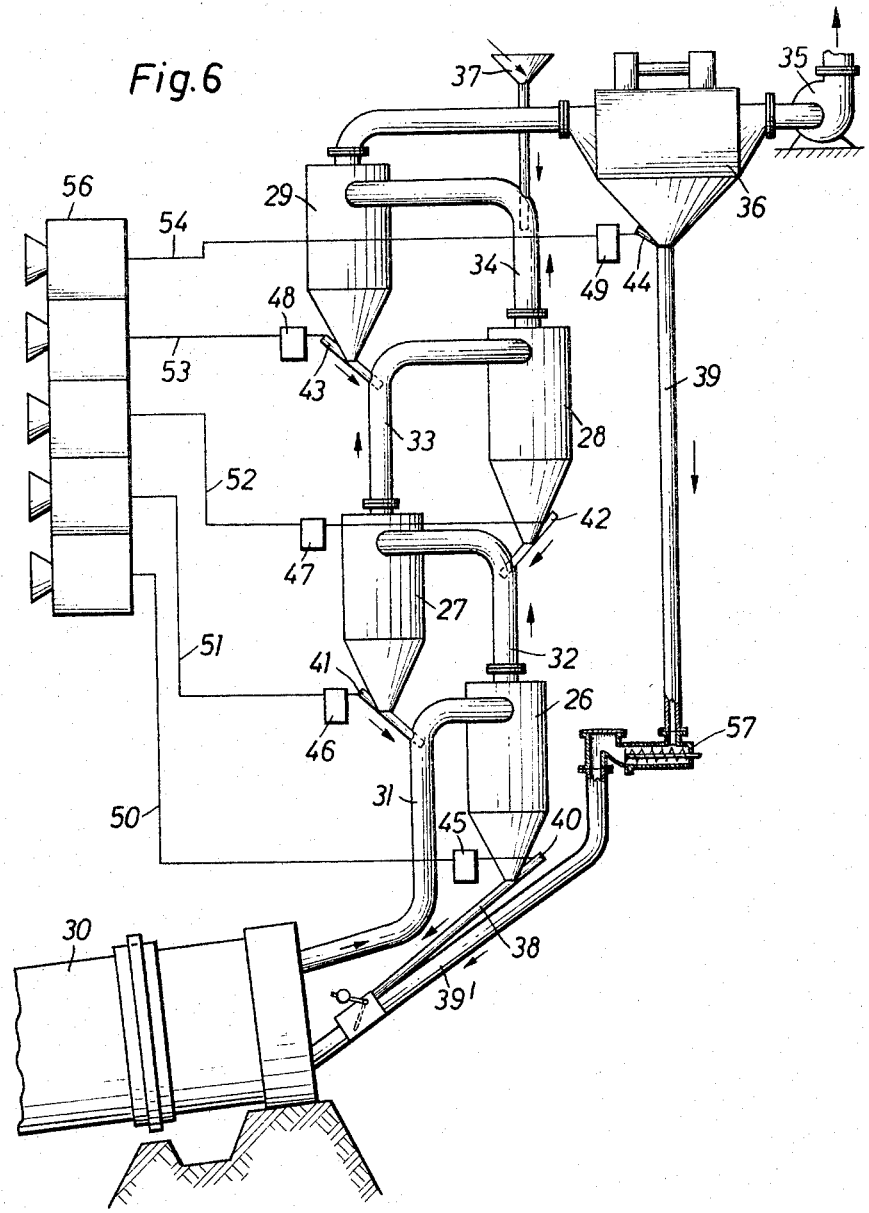
FIG. 6 shows schematically a complete system of a heat exchanger for the preheating of cement raw material, equipped with supervisory apparatus according to the invention.

The dust separator 1 according to FIG. 1 is in the form of a cyclone which receives a flow of dust-laden hot gas through a gas conduit 2 extending tangentially to the cylindrical separator tank. The dust material is centrifugally separated in the separator and then drains along the downwardly tapering bottom portion of the separator through an outlet opening 5 into a dust-discharge duct 3. The hot gases, liberated from the dust, leave the separator through a gas conduit 4 extending centrally from the top of the tank. The gases are forced or exhausted through the separator by a blower so that the interior of the separator is under positive or negative pressure respectively relative to ambient atmospheric pressure. When the separator is employed for preheating cement raw material, as is the case in a plant as shown in FIG. 6 which is still to be described hereinafter, the gas is exhausted through the separator by means of a blower 35, so that the interior of the separator is under negative pressure.

For supervising the dust-discharging performance of the separator 1, the dust-discharge duct 3 is provided, in the vicinity of the dust-outlet opening 5, with an upward extension or appendix 6 which carries on its outermost upper end a removable closure cap 7 formed with a narrow orifice 8 through which the interior of the dust separator communicates with the free atmosphere.

In the event the outlet opening 5 is clogged or partially obstructed by the accumulation of caking dust, the cap 7 can readily be taken off and an iron rod can then be pushed through the tubular extension 6 for removing the accumulation.

A closure device which permits the escape of solid substances but prevents the passage of gas is mounted in the dust-discharge duct beneath the outlet opening 5 and forms part of the separator structure. In the illustrated example, the closure device essentially consists of a pivotally mounted flap 9 which is held in closing position by means of a weight 10. When a sufficient quantity of dust material collects on top of the flap 9, it will open under the weight of the accumulation to let the material pass through, but the flap and the material passing through prevents gas from entering from below into the duct 3.

To prevent dust deposits from accumulating in the tubular extension 6, this extension is located upwardly of the dust-discharge duct 3 proper. The axis of the tubular extension 6 forms with the vertical axis of the dust separator tank 1 an acute angle α. Located in the tubular extension or appendix 6 of the dust-discharge duct 3 is the measuring or sensing point of a device which is responsive to the gas quantity flowing through the orifice to or from the ambient air. In the embodiment of FIG. 1, this device measures the static pressure obtaining in the tubular extension 6. The device comprises a pressure line 11, which communicates with the interior of the tubular extension 6 just ahead of the opening 8, a ceramic filter 12, a volume-equalizing container 13, and a measuring instrument 14, for example a contact vacuum-meter. To permit cleaning of the pressure line 11, a stop valve 15 with a blow-out nipple 16 is interposed in the line 11 between the tubular extension 6 and the filter 12. An adjustable throttle valve 17 is connected in the pressure line between the filter 12 and the container 13. The valve 17 and the container 13 protect the measuring instrument 14 from overload that may be caused by pressure surges resulting from sudden reversal of dust flow in the discharge duct 3. The ceramic filter 12 prevents dust from passing through the line 11 into the instrument 14. The instrument 14 may simply indicate the occurrence of irregular pressure conditions or may be connected through a signal line 18 with an optical or acoustical signaling device (not illustrated).

As aforementioned, the sensing or measuring device primarily responds to the static pressure obtaining in the tubular extension 6. In order to get highly accurate measuring results, the orifice 8 in the closure cap 7 is narrow so that only minute quantities of air can pass into the separator when it operates at negative pressure, or only minute quantities of gas can escape when the separator operates under positive pressure. The leakage quantities thus passing through the orifice 8 are too little to have an appreciable effect upon the pressure, such as the negative pressure, obtaining in the separator and consequently in the tubular extension 6. Only when dust accumulation takes place in the vicinity of the dust-outlet opening 5, resulting in clogging of the lower portion of tubular extension 6, is the communication between the interior of the dust-separator chamber proper and the interior of the tubular extension 6 interrupted or sufficiently impeded to effect pressure equalization between the interior of the extension 6 and the ambient atmosphere with the result that flow through the orifice 8 ceases. The occurrence of such pressure equalization is sensed by the instrument 14, that is, the point of the instrument, normally indicating a given datum value, moves back to zero. At this moment, a contact in instrument 14 closes a circuit which actuates the aforementioned acoustic or optical signaling device, for example.

Figure 2:
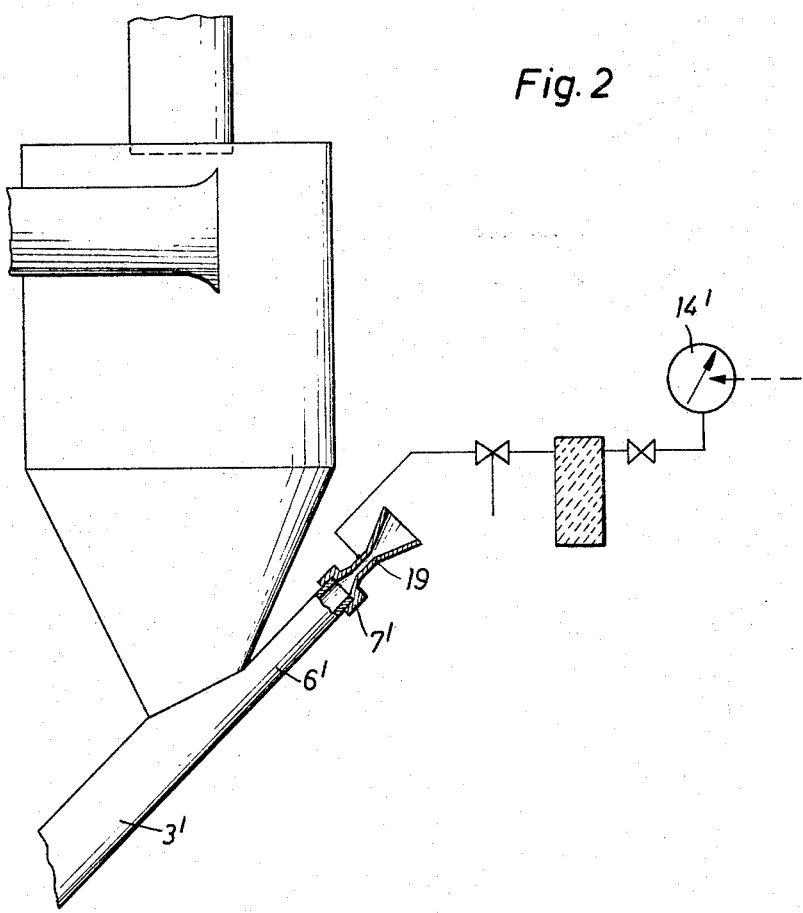
FIG. 2 shows schematically another embodiment equipped with a venturi nozzle at the point of communication between the dust-discharge duct and the ambient atmosphere.

As shown in FIG. 2, the pressure measuring device, provided with an indicating instrument 14', can also be connected to a Venturi nozzle 19 located on the closure cap 7' of the tubular extension 6'. The Venturi nozzle responds to the dynamic pressure obtaining at the region of communication between the interior of the tubular extension and the ambient atmosphere, during the measuring operation. The provision of such a Venturi device is advantageous when sudden increases in pressure take place due to surging dust reversals in the discharge duct 3', as a damping is imposed upon the pressure wave due to the larger quantities of gas which then pass through the Venturi tube. The provision of an additional volume container (13 in FIG. 1) is unnecessary with such a measuring system as is shown in FIG. 2.

According to FIG. 3, a dust separator that operates under positive or negative pressure relative to the ambient atmosphere may also be supervised by a device that measures the differential pressure between the aforementioned connecting channel or orifice on the one hand and the precipitator system on the other hand. A difference-pressure meter 20 is provided with two input lines that are connected respectively to a pressure line 11' leading to the tubular extension 6", and to a line 21 communicating with the gas-outlet conduit 4' of the separator. The pressure line 21 is constructed similar to the pressure line 11 shown in FIG. 1, that is, a stop valve 22 with a blow-out nipple 23, as well as a ceramic filter 24 and a throttle valve 25 are serially interposed in the line 21. Since the pressure in the gas-outlet conduit 4' is substantially constant, the differential pressure sensing device responds to a pressure change in the tubular extension 6" and thereby to the occurrence of clogging in the dust separator close to the latter's dust-outlet opening.

FIG. 4 shows a closure cap 7" which can be used on the top end of the aforementioned tubular extensions and which has been modified by providing a filter plate 60 in lieu of the aforementioned narrow orifice 8. The filter plate 60 consists of ceramic or metallic material, for example sintered metal. Such a filter plate, having a relatively large resistance to gas flow, prevents the passage of considerable quantities of air or gas even if it is provided with relatively large dimensions. For that reason it is also possible, as shown in FIG. 5, to cover the entire outlet cross section of the opening at the upper end of the tubular extension 6''' by a preferably removable filter plate 61, instead of using the closure cap. It is further preferable to provide a similar filter plate 62 between the opening of the pressure line 11" and the lower end of the extension 6'''. This prevents dust from entering the pressure line 11" and thereby clogging this line or affecting the measuring instruments. The provision of such a filter plate 62 between the dust-discharge duct or dust separator proper and the opening of the pressure line 11" is therefore of particular advantage when the dust separator system operates under positive pressure or is subject to gas or air pressure surges in the separator system or in a kiln or other device connected therewith. The filter disc 62 is also preferably removable so that rods or other tools can be inserted into the tubular extension and into the dust-discharge duct for the elimination of the clogging dust.

Our invention is particularly useful for the supervision of separators operating under positive or negative pressure in heat-exchanger plants for the preheating of cement raw material. A preheater plant of this type is schematically illustrated in FIG. 6. It comprises several dust separators 26, 27, 28, 29 which, with respect to the gas path, are connected in series with each other and to the waste-gas outlet conduit 31 of a rotary cement kiln. The gas inlet of the lowermost separator 26 is connected by the gas conduit 31 with the stationary flue hood of the kiln 30. The hot gases coming from the kiln and passing through conduit 31 into separator 26 then flow sequentially through the separators 27, 28 and 29 which are connected with each other by respective gas conduits 32, 33 and 34. The relatively cool gases are withdrawn from the outlet conduit of the uppermost separator 29 through an electrostatic dust separator 36 by means of a blower 35. The cement raw material that is to be heated passes from a feeder hopper 37 into the ascending gas flow in conduit 34 and is entrained into the uppermost separator 29 where it is separated and permitted to drain into the gas conduit 33 to be entrained into the next lower separator 28. This operation is repeated with the individual subsequent separators and gas conduits, until the material, gradually heated in this manner, passes through the dust-discharge duct 38 of the lowermost separator 26 into the kiln 30. The residual dust separated from the waste gases in the electrostatic precipitator 36 passes through dust pipes 39, 39' and an intermediate lock or sluice of the feed-screw type 57, into the kiln.

For supervision of proper dust-discharging performance, the individual dust separators are provided in the vicinity of their respective dust outlet openings with respective tubular extensions 40, 41, 42, 43, 44 which are connected with respective pressure-measuring devices 45, 46, 47, 48, 49 of the type described with reference to any of the embodiments illustrated in FIGS. 1 to 3. The individual measuring devices are connected through respective signal lines 50 to 54 with a signal panel 56 composed of individual acoustic and optical signaling devices. The signal panel 56, preferably together with other indicating devices for operation of the kiln and heat exchanger, is mounted at the control stand of the plant, usually in the vicinity of the kiln head.

In operation, the individual dust separators of the heat-exchanger plant are under negative pressure. If the pressure difference at the point of communication with the ambient air becomes substantially equalized due to clogging in the vicinity of the dust-outlet opening and/or the dust-discharge duct, the supervisory equipment will respond in the manner described above for example with reference to FIG. 1. Since the acoustical and optical signaling devices on panel 56 are arranged separately for each dust separator, the attending personnel can immediately ascertain which particular separator is apt to be affected. In this manner, danger of clogging in the individual dust separators can be readily eliminated before serious difficulties are encountered.

Apparatus constructed according to our invention for the supervision of dust separators which operate under pressure differing from that of the ambient atmosphere are not limited to those particularly illustrated and described herein, but are applicable to various other types of dust separators that are subject to danger of clogging at the dust-outlet openings. It will be apparent to those skilled in the art, upon study of this disclosure, that our invention can be modified in various respects, such as with regard to the particular sensing or measuring means employed. For example, the sensing means can directly respond to the quantity of gas or air instead of to the pressure thereof. Such modifications and adaptations are intended to be comprehended within the meaning and range of equivalents of the following claims.

We claim:

1. With a dust-from-gas seperator, particularly for heat exchange between gases and fine-granular solids, having a separator chamber whose operating pressure differs from ambient atmospheric pressure, and having dust outlet means communicating therewith and defining a dust flow path therefrom, the combination of supervisory apparatus comprising an air inlet means located outside of said flow path and communicating with said dust outlet means near said chamber, said air inlet means comprising a tubular member connected with said dust outlet means and orifice means disposed on said tubular member, said orifice means usually providing communication between the ambient atmosphere and said chamber through said tubular member and part of said outlet means, and a sensing device communicating with said air inlet means, said sensing device being responsive to changes in gas flow through said orifice means as indicative of dust-discharge trouble.

2. Supervisory apparatus according to claim 1, wherein said orifice means comprises a closure cap removably secured to an end of said tubular member and having an orifice for the passage of gas through said cap.

3. Supervisory apparatus according to claim 1, wherein said orifice means comprises a removable gas-permeable filter located at an end of said tubular member.

4. Supervisory apparatus according to claim 1, comprising a heat-resistance gas-permeable filter mounted in said tubular member between the respective connecting locations of said tubular member with said dust outlet means and said sensing device.

5. Supervisory apparatus according to claim 1, wherein the dust-outlet means comprises a dust-discharge duct extending from a bottom outlet opening in the separator chamber at an acute angle to the vertical axis of the separator chamber, said tubular member being integral with the duct and extending upwardly beyond said outlet opening at substantially said same acute angle to said vertical axis.

6. Supervisory apparatus according to claim 5, including gas-stop means mounted in the dust-discharge duct downwardly spaced from the bottom outlet opening in the separator chamber for preventing the passage of gas but permitting the passage of solids, said gas-stop means comprising a counterweighted pivotable flap.

References Cited by the Examiner

UNITED STATES PATENTS

| | | | |
|---|---|---|---|
| 1,940,921 | 12/1933 | Smith | 138—44 X |
| 2,213,812 | 9/1940 | Harper et al. | 138—44 |
| 2,288,715 | 7/1942 | Karrer et al. | 138—41 X |
| 2,486,133 | 10/1949 | Egger | 138—41 |
| 2,797,076 | 6/1957 | Muller | 55—459 X |
| 2,853,241 | 9/1958 | Gindoff et al. | |
| 2,911,065 | 11/1959 | Yellott et al. | 55—274 |
| 2,973,057 | 2/1961 | Yellott et al. | 55—274 X |
| 3,079,954 | 3/1963 | Kanpp | 138—41 |

ROBERT F. BURNETT, *Primary Examiner.*